(12) United States Patent
Fujii

(10) Patent No.: US 7,669,563 B2
(45) Date of Patent: Mar. 2, 2010

(54) VARIABLE VALVE CONTROL APPARATUS

(75) Inventor: Takeshi Fujii, Hyogo (JP)

(73) Assignee: Fujitsu Ten Limited, Kobe-Shi (JP)

( * ) Notice: Subject to any disclaimer, the term of this patent is extended or adjusted under 35 U.S.C. 154(b) by 965 days.

(21) Appl. No.: 11/431,519

(22) Filed: May 11, 2006

(65) Prior Publication Data

US 2006/0266311 A1 Nov. 30, 2006

(30) Foreign Application Priority Data

May 12, 2005 (JP) ............................. 2005-139440

(51) Int. Cl.
*F01L 1/34* (2006.01)
(52) U.S. Cl. .................. 123/90.15; 123/90.17; 123/347
(58) Field of Classification Search .............. 123/90.15, 123/90.16, 90.17, 90.18, 345, 346, 347, 348
See application file for complete search history.

(56) References Cited

U.S. PATENT DOCUMENTS 6,408,806 B2 * 6/2002 Sugiyama et al. ......... 123/90.15
6,412,455 B1 * 7/2002 Ogiso et al. ............... 123/90.11
6,615,775 B2 * 9/2003 Takemura et al. ......... 123/90.15

FOREIGN PATENT DOCUMENTS

| JP | A 09-209786 | 8/1997 |
| JP | A 2004-340018 | 12/2004 |
| JP | A 2005-048627 | 2/2005 |

* cited by examiner

*Primary Examiner*—Ching Chang
(74) *Attorney, Agent, or Firm*—Oliff & Berridge, PLC

(57) ABSTRACT

A variable valve control apparatus includes a variable valve timing mechanism that adjusts an actuation timing of an intake valve and an actuation timing of an exhaust valve; a variable working angle mechanism that adjusts a working angle of the intake valve; a variable valve control section that controls at least one of the variable valve timing mechanism and the variable working angle mechanism based on an engine load; and a negative pressure suppression control section. The negative pressure suppression control section suppresses a negative pressure of an inside of a cylinder when the negative pressure suppression control section determines that both of the intake valve and the exhaust valve close after an intake top dead center, based on opening conditions of the intake valve and the exhaust valve.

14 Claims, 11 Drawing Sheets

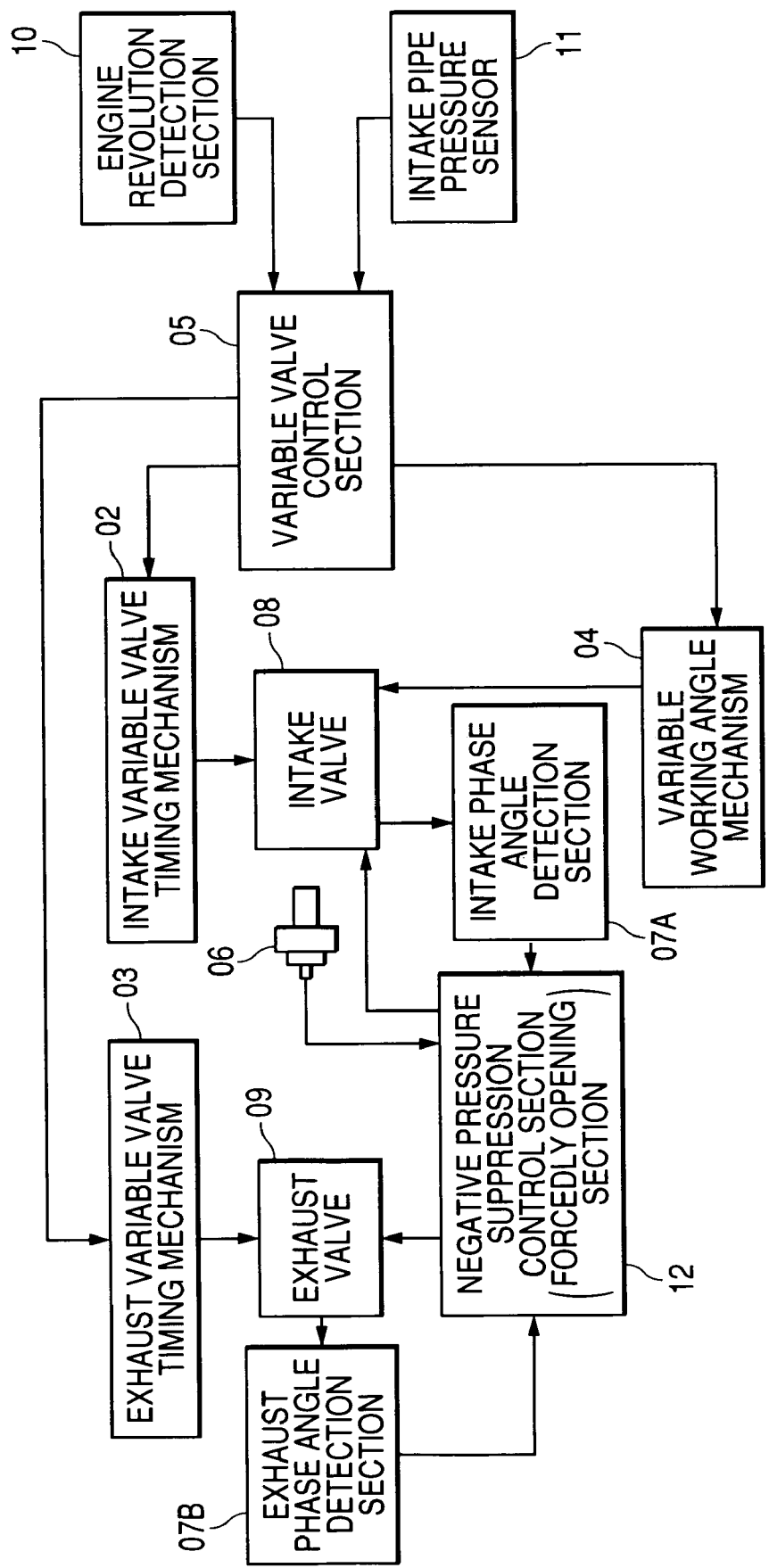

STATE IN WHICH THE INSIDE OF CYLINDER HAS HIGHER THAN PREDETERMINED PRESSURE

STATE IN WHICH THE INSIDE OF CYLINDER HAS PREDETERMINED PRESSURE OR LOWER

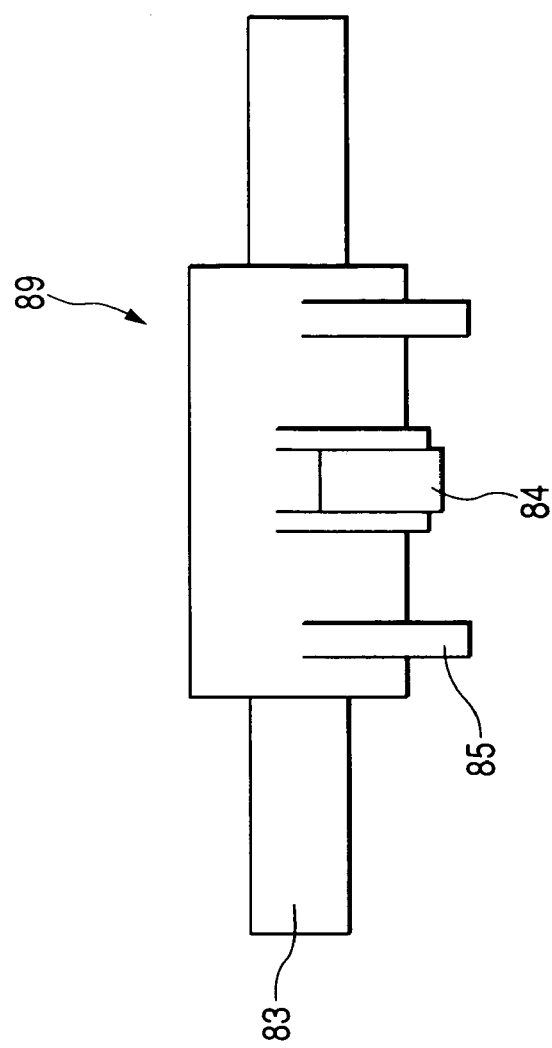
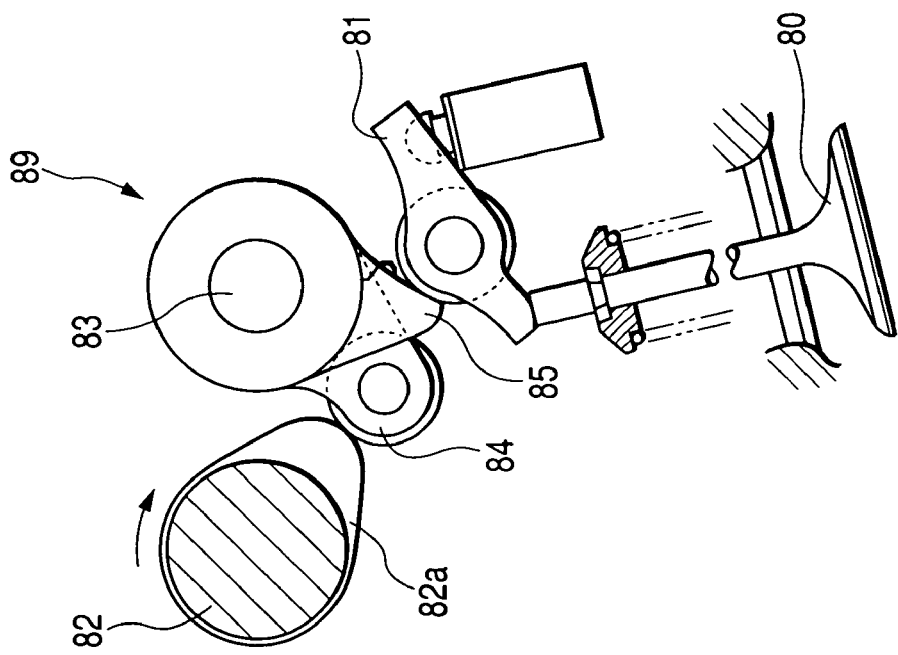

VARIABLE VALVE CONTROL APPARATUS

BACKGROUND OF THE INVENTION

1. Field of the Invention

The present invention relates to a variable valve control apparatus which includes a variable valve timing mechanism that adjusts actuation timing of a valve and a variable working angle mechanism that adjusts a working angle of the valve and includes variable valve control section that controls the variable valve timing mechanism or the variable working angle mechanism based on an engine load.

2. Description of the Related Art

The variable valve control apparatus described above includes variable valve control section in which a stable output is ensured at a wide range of engine revolution extending from a low range to a high range. In order to suppress surplus consumption of fuel in the low range, an intake side variable valve timing mechanism and an exhaust side variable valve timing mechanism actuated by an oil hydraulic mechanism are provided. And, a variable working angle mechanism for adjusting a lift amount of an intake valve is also provided. Then, according to an engine load, in the low range, retard angle control of the intake valve is performed by the intake side variable valve timing mechanism or control of decreasing the working angle is simultaneously performed by the variable working angle mechanism. And, in the high range, advance angle control of the intake valve is performed by the intake side variable valve timing mechanism or control of increasing the working angle is simultaneously performed by the variable working angle mechanism.

As shown in FIG. 11, the variable valve timing mechanism 99 includes a housing 92 for turning relatively to a cam shaft 90 including cams 90a for opening and closing an intake valve or an exhaust valve, a vane rotor 91 which is installed inside the housing 92 and rotates integrally with the cam shaft 90, plural vanes 94 installed in the outer circumference of the vane rotor 91, and an oil chamber 95 which is formed inside the housing 92 and receives the vanes 94 and guides an oil pressure. That is, it is configured so that the housing 92 rotates integrally with the vane rotor 91 and also the housing 92 turns relatively to the vane rotor 91.

The oil chamber 95 is partitioned by inner circumferential surfaces etc. of the housing 92, the vane rotor 91 and the vanes 94, and is configured to include a retard angle chamber 95a formed in a direction of opposite rotation of the cam shaft 90 with respect to the vanes 94 and an advance angle chamber 95b formed in a direction of rotation of the cam shaft 90 with respect to the vanes 94.

The retard angle chamber 95a and the advance angle chamber 95b are respectively provided with oil lines (not shown) for guiding hydraulic oil and it is configured so that by making the hydraulic oil act on the retard angle chamber 95a and the advance angle chamber 95b, a relative position of the vanes 94 to the oil chamber 95 is rotated and a phase of the cam shaft 90 is varied continuously.

That is, the variable valve timing mechanism 99 is configured so that when a rotation operation based on a rotation operation of a crankshaft (not shown) transferred through a timing belt 96 is performed by a cam pulley 97 formed in the outside of the housing 92, the housing 92 rotates integrally with the timing belt 96 and also a relative position of the vanes 94 to the oil chamber 95 is varied and thereby a phase between a rotational angle of the crankshaft and a rotational angle of the cam shaft 90 rotating integrally with the vanes 94 can be varied. That is, valve opening and closing timing of the intake valve or the exhaust valve with respect to an operation of a piston connected to the crankshaft can be varied. Further in other words, intake actuation timing of the intake valve or exhaust actuation timing of the exhaust valve can be varied.

As shown in FIGS. 12A and 12B, the variable working angle mechanism 89 is configured to include a control shaft 83, which is disposed between a roller rocker arm 81 connected to an intake valve 80 and an intake cam 82a disposed in an intake cam shaft 82 and is connected to an electric motor (not shown), an arm 84, which is formed on the control shaft 83 and receives the intake cam 82a, and a nose 85, which is formed on the control shaft 83 similarly and depresses the intake valve 80 through the roller rocker arm 81.

The intake cam 82a depresses the arm 84 with rotation driving of the intake cam shaft 82 and thereby the control shaft 83 rotates. And, the control shaft 83 rotates and thereby the roller rocker arm 81 is depressed by the nose 85 and the intake valve 80 is depressed. When the intake cam 82a is not in contact with the arm 84, that is, the arm 84 is not depressed by the intake cam 82a, the control shaft 83 rotates and returns to a predetermined angle by a return mechanism (not shown). Further, it is configured so that the predetermined angle can be varied by the electric motor.

That is, the variable working angle mechanism 89 is configured so that the amount of rotation of the control shaft 83 rotating by depression of the arm 84 by the intake cam 82a can be adjusted by varying the predetermined angle of the control shaft 83. And, the amount of rotation of the control shaft 83 can be adjusted and thereby a lift amount of the intake valve 80 through the roller rocker arm 81 by the nose 85 can be adjusted. In other words, it is configured so as to adjust a lift amount of the intake valve 80 by a working angle through the control shaft 83.

When timing at which both of the intake valve and the exhaust valve close at a same time after a piston of the cylinder passes an intake top dead center in the case where valve control is performed by the variable valve control section described above, there is fear that an inside of a cylinder becomes a negative pressure and oil is sucked up from an oil reservoir of the crank side and burns. In order to avoid occurring of the timing, such control is performed that preset a phase of the intake valve to the side of an advance angle than a target value based on simulation or experiment under different conditions.

SUMMARY OF THE INVENTION

However, while a phase of the conventional variable valve timing mechanism described above is controlled by an oil hydraulic mechanism, a variable working angle mechanism is controlled by an electric motor. Therefore, for example, when advance angle control of an intake valve is performed and simultaneously control of decreasing a working angle is performed, there is fear that timing at which the working angle is decreased and actuated previously resulting from a response delay of the oil hydraulic mechanism and the intake valve and the exhaust valve close at the same time after the piston of the cylinder passes the intake top dead center. When a phase of the intake valve is set to the side of an advance angle than a target value in order to avoid occurring of a negative pressure inside the cylinder, it is difficult to ensure a stable output at a wide range of engine revolutions while improving fuel efficiency.

The present invention has been made in view of the above circumstances and provides a variable valve control apparatus. According to an embodiment of the invention, the variable valve control apparatus may be capable of ensuring good driving performance by preventing variations in torque and also improving fuel efficiency while ensuring a stable output at a wide range of engine revolutions.

According to a first aspect of the invention, there is provided a variable valve control apparatus including a variable valve timing mechanism that adjusts an actuation timing of an intake valve and an actuation timing of an exhaust valve; a variable working angle mechanism that adjusts a working angle of the intake valve; a variable valve control section that controls at least one of the variable valve timing mechanism and the variable working angle mechanism based on an engine load; and a negative pressure suppression control section. The negative pressure suppression control section suppresses a negative pressure of an inside of a cylinder when the negative pressure suppression control section determines that both of the intake valve and the exhaust valve close at least after an intake top dead center, based on an opening condition of the intake valve and a opening condition of the exhaust valve.

According to the configuration described above, while the working angle or a phase of the intake valve is set at a proper control target in order to improve fuel efficiency, in the case where it is determined that the intake valve and the exhaust valve close at the same time after the piston of the cylinder passes the intake top dead center, the negative pressure of the inside of the cylinder is suppressed by the negative pressure suppression control section, so that abnormal combustion due to suction of oil can be avoided.

In addition, the negative pressure suppression control section may perform control of increasing the working angle of the intake valve when the negative pressure suppression control section determines that both of the intake valve and the exhaust valve close.

According to the configuration described above, even when control of decreasing the working angle of the intake valve is performed, the working angle is corrected to an increase side by the negative pressure suppression control section, so that a situation in which the inside of the cylinder becomes the negative pressure is suppressed.

In addition, the negative pressure suppression control section may perform a retard angle control of the exhaust valve when the negative pressure suppression control section determines that both of the intake valve and the exhaust valve close.

According to the configuration described above, for example, even when there is a delay in response in the case where advance angle control of the intake valve is performed by the variable valve control section, the exhaust valve is simultaneously controlled to a retard angle side by the negative pressure suppression control section, so that a situation in which the inside of the cylinder becomes the negative pressure is suppressed.

In addition, the negative pressure suppression control section increases a feedback control constant to the intake valve in the variable valve control section when the variable valve control section performs the advance angle control of the intakes valve and when the negative pressure suppression control section determines that both of the intake valve and the exhaust valve close.

According to the configuration described above, even when an abnormal delay in response occurs due to unexpected variations etc. in oil pressure in the case where the advance angle control of the intake valve is performed by the variable valve control section, the feedback control constant to the intake valve is increased by the negative pressure suppression control section, so that control to a control target is performed speedily before the inside of the cylinder becomes the negative pressure.

In addition, the negative pressure suppression control section may stop controlling of decreasing the working angle of the intake valve by the variable valve control section when the variable valve control section performs the advance angle control of the intakes valve and control of decreasing the working angle of the intakes valve, and when the negative pressure suppression control section determines that both of the intake valve and exhaust valve close.

According to the feature configuration described above, when the control of decreasing the working angle and the advance angle control of the intake valve are performed by the variable valve control section, the working angle can be prevented from being decreased excessively, so that a situation in which the inside of the cylinder becomes the negative pressure can be suppressed.

In addition, the negative pressure suppression control section may perform control of increasing a pressure of hydraulic oil for actuating the variable valve timing mechanism when the variable valve control section performs the advance angle control of the intake valve and when the negative pressure suppression control section determines that both of the intake valve and the exhaust valve close.

According to the feature configuration described above, even when abnormal delay in response occurs due to unexpected variations etc. in oil pressure in the case where the advance angle control of the intake valve is performed by the variable valve control section, the negative pressure suppression control section increases the hydraulic pressure for actuating the variable valve timing mechanism, so that the advance angle control of the intake valve can be promoted and a situation in which the inside of the cylinder becomes the negative pressure can be suppressed.

In addition, the variable valve timing mechanism may include an oil hydraulic mechanism that supplies the hydraulic oil to through a common oil line to actuate the intake valve and the exhaust valve. And the negative pressure suppression control section may close an oil line connected to the exhaust valve when the variable valve control section performs the advance angle control of the intake valve and when the negative pressure suppression control section determines that both of the intake valve and the exhaust valve close.

According to the feature configuration described above, even when abnormal delay in response occurs due to unexpected variations etc. in oil pressure in the case where the advance angle control of the intake valve is performed by the variable valve control section, the negative pressure suppression control section can increase the oil pressure for actuating the variable valve timing mechanism of the intake valve side by closing an oil line to the exhaust valve side and the advance angle control of the intake valve is promoted surely, so that a situation in which the inside of the cylinder becomes the negative pressure can be suppressed.

In addition, the negative pressure suppression control section may include a forced opening section that forcedly opens the intake valve regardless of valve control by the variable valve control section when the negative pressure suppression control section determines that both of the intake valve and the exhaust valve close.

According to the feature configuration described above, the forcedly opening section forcedly opens the intake valve regardless of valve control by the variable valve control section, so that even when a condition that the inside of the cylinder becomes the negative pressure due to some abnormality etc. occurs, a situation in which the inside of the cylinder becomes the negative pressure can be suppressed surely.

In addition, the negative pressure suppression control section may include a pressure valve that forcedly supplies air to the inside of the cylinder when the negative pressure suppression control section determines that both of the intake valve and the exhaust valve close.

According to the feature configuration described above, the pressure valve forcedly supplies air to the inside of a cylinder, so that a situation in which the inside of the cylinder becomes the negative pressure can be suppressed surely.

The variable valve control apparatus may include a throttle control section that performs control of decreasing an opening degree of an electronic control throttle when the negative pressure of the inside of the cylinder is suppressed by the negative pressure suppression control section.

According to the feature configuration described above, the throttle control section performs control of decreasing of the opening degree of the electronic control throttle when the negative pressure of the inside of the cylinder is suppressed by the negative pressure suppression control section, so that variations in engine torque can be prevented even when the negative pressure of the inside of the cylinder is suppressed.

The variable valve control apparatus may include an ignition timing control section that delays the ignition timing when the negative pressure of the inside of the cylinder is suppressed by the negative pressure suppression control section.

According to the feature configuration described above, the ignition timing control section delays the ignition timing when the negative pressure of the inside of the cylinder is suppressed by the negative pressure suppression control section, so that variations in engine torque can be prevented even when the negative pressure of the inside of the cylinder is suppressed.

In addition, the variable valve control apparatus may include a fuel injection quantity control section that decreases a fuel injection quantity when the negative pressure of the inside of the cylinder is suppressed by the negative pressure suppression control section. According to the feature configuration described above, the fuel injection quantity control section decreases the fuel injection quantity when the negative pressure of the inside of the cylinder is suppressed by the negative pressure suppression control section, so that variations in engine torque can be prevented even when the negative pressure of the inside of the cylinder is suppressed.

According to a second aspect of the invention, there is provided a variable valve control apparatus including: a valve timing control section that controls an actuation timing of an intake valve and an actuation timing of an exhaust valve by controlling a variable valve timing mechanism; a working angle control section that controls a working angle of the intake valve by controlling a variable working angle mechanism; and a negative pressure suppression control section that performs control of suppressing a negative pressure of an inside of a cylinder when the negative pressure suppression control section determines that both of the intake and the exhaust valve close based on operation states of the intake valve and the exhaust valve.

According to a third aspect of the invention, there is provided a variable valve control apparatus including: a valve timing control section that controls an actuation timing of an intake valve and an actuation timing of an exhaust valve by controlling a variable valve timing mechanism operated by an oil pressure; and a working angle control section that controls a working angle of the intake valve by controlling a variable working angle mechanism operated by a motor. The working angle control section performs control of increasing a working angle of at least one of the intake valve and the exhaust valve when the working angle control section determines that both of the intake and the exhaust valve close based on operation states of the intake valve and exhaust valve.

According to the configuration described above, since the working angle control section that controls the variable valve timing mechanism operated by an oil pressure having a tendency that a control response becomes slower than that of variable working angle mechanism operated by a motor performs control so that the working angle of at least one of the intake valve and the exhaust valve increases in the case where it is determined that both of the intake valve and the exhaust valve close, based on operation states of the intake valve and the exhaust valve, a control response of the variable valve timing mechanism can be increased. That is, the working angle control section can perform control so as to speedily open the valve in the case where it is determined that both of the intake valve and the exhaust valve close, based on operation states of the intake valve and the exhaust valve. Therefore, a situation in which the inside of the cylinder becomes the negative pressure can be avoided.

According to another aspect of the invention as described above, a variable valve control apparatus may be capable of ensuring good driving performance by preventing variations in torque and also improving fuel efficiency while ensuring a stable output at a wide range of engine revolutions can be provided.

BRIEF DESCRIPTION OF THE DRAWINGS

FIG. 2A is an explanatory diagram showing transition in a phase of the intake valve and a phase of the exhaust valve, and FIG. 2B is an explanatory diagram showing transition in an intake working angle and a phase of the intake valve.

FIG. 4A is the case where the negative pressure suppression control section performs control of increasing an intake working angle, and FIG. 4B is the case where the negative pressure suppression control section performs retard angle control of exhaust actuation timing.

FIG. 9 is an explanatory diagram of a functional block configuration of a variable valve control apparatus including negative pressure suppression control section acting as forcedly opening section.

FIGS. 12A and 12B are explanatory diagrams of a variable working angle mechanism.

DETAILED DESCRIPTION OF THE INVENTION

Figure 1:
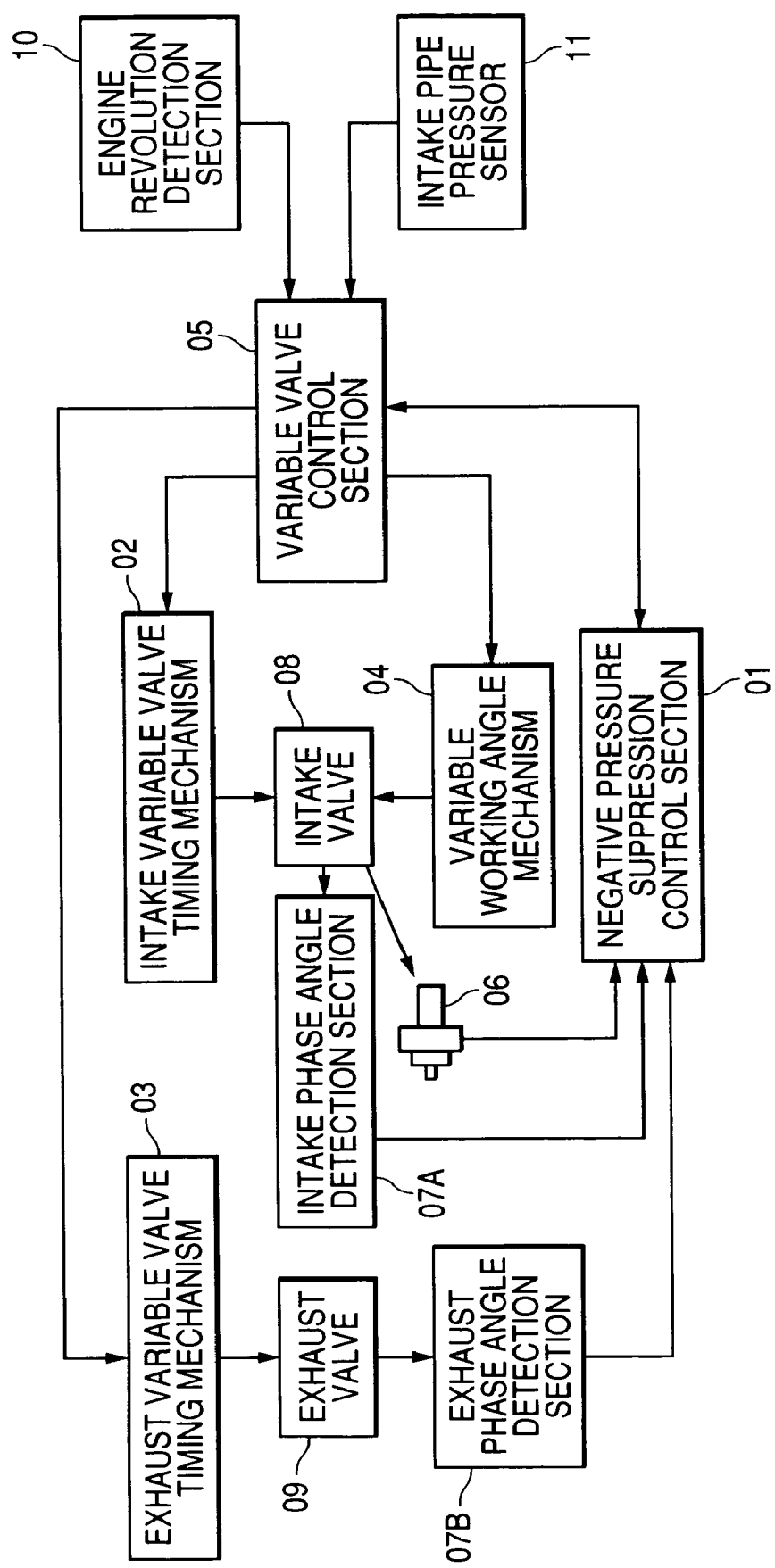
FIG. 1 is an explanatory diagram of a functional block configuration of a variable valve control apparatus.

Embodiments of a variable valve control apparatus according to the invention will be described below. The variable valve control apparatus according to the invention is configured to include an intake variable valve timing mechanism 02 that adjusts a phase angle acting as intake actuation timing of an intake valve 08, an exhaust variable valve timing mechanism 03 that adjusts a phase angle acting as exhaust actuation timing of an exhaust valve 09, an intake variable working angle mechanism 04 that adjusts an intake working angle of the intake valve 08, that is, a lift amount of the intake valve 08, variable valve control section 05 that controls the intake variable valve timing mechanism 02 and the intake variable working angle mechanism 04 based on an engine load etc., intake lift detection section 06 that detects a working angle of the intake valve 08, intake phase angle detection section 07A that detects a phase angle of the intake valve 08, exhaust phase angle detection section 07B that detects a phase angle of the exhaust valve 09, and negative pressure suppression control section 01 that suppresses a negative pressure of the inside of the cylinder in the case where it is determined that both of the intake valve 08 and the exhaust valve 09 close after a piston of the cylinder passes an intake top dead center as shown in FIG. 1.

Figure 11:
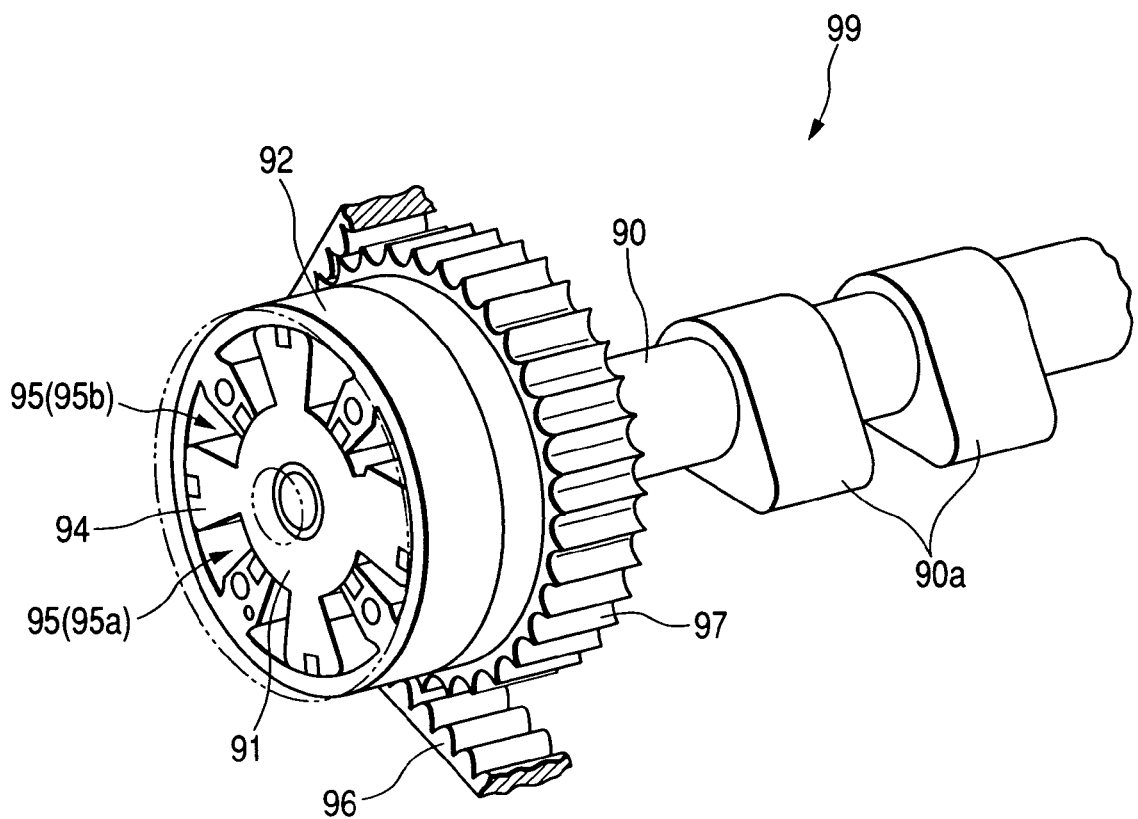
FIG. 11 is an explanatory diagram of a variable valve timing mechanism.

The intake variable valve timing mechanism 02 is section that adjusts intake actuation timing of the intake valve 08 and is configured by the variable valve timing mechanism 99 shown in FIG. 11. Also, the exhaust variable valve timing mechanism 03 is section that adjusts exhaust actuation timing of the exhaust valve 09 and is configured by the variable valve timing mechanism 99 shown in FIG. 11 similarly. In addition, the intake variable valve timing mechanism 02 and the exhaust variable valve timing mechanism 03 are configured so that retard angle control can be performed by increasing a pressure of hydraulic oil to the retard angle chamber 95a and advance angle control can be performed by increasing a pressure of hydraulic oil to the advance angle chamber 95b of the respective variable valve timing mechanisms.

The intake variable working angle mechanism 04 is section that adjusts an intake working angle with respect to the intake valve 08, and is configured by the variable working angle mechanism 89 shown in FIGS. 12A and 12B, and is configured so that a working angle, that is, a lift amount of the intake valve 80 increases by increasing a working angle of the control shaft 83.

The variable valve control section 05 performs control so that a stable engine output can be ensured at wide engine revolutions extending from a low range to a high range by controlling any of the intake variable valve timing mechanism 02, the exhaust variable valve timing mechanism 03 and the intake variable working angle mechanism 04 or their combinations so as to become a control target value set based on a control target value map preset based on a load state of an engine obtained from the number of revolutions of the engine detected by engine revolution detection section 10 or an intake pipe pressure, etc. detected by an intake pipe pressure sensor 11.

Figure 2A:
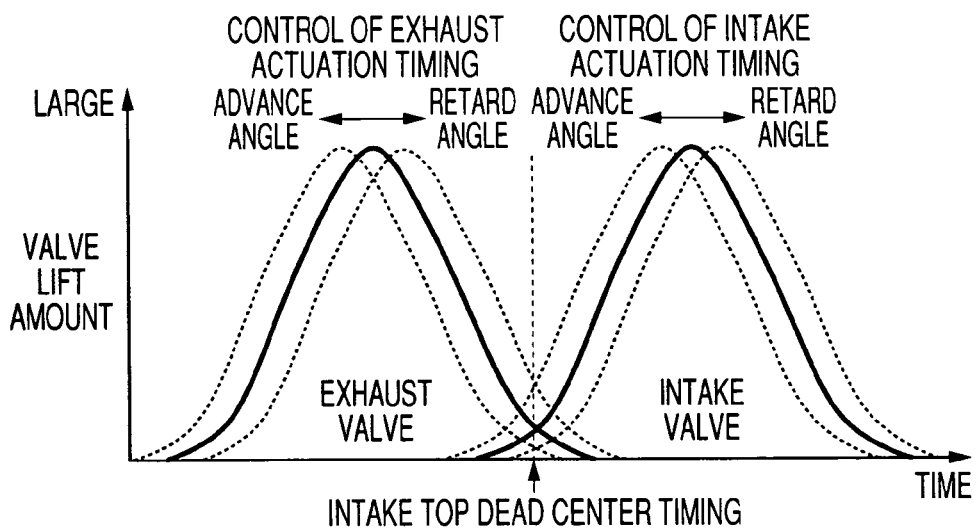
FIGS. 2A and 2B are explanatory diagrams of a relation between a phase angle of an exhaust valve and a phase angle and a working angle (lift amount) of an intake valve before and after the intake top dead center timing.
Figure 2B:
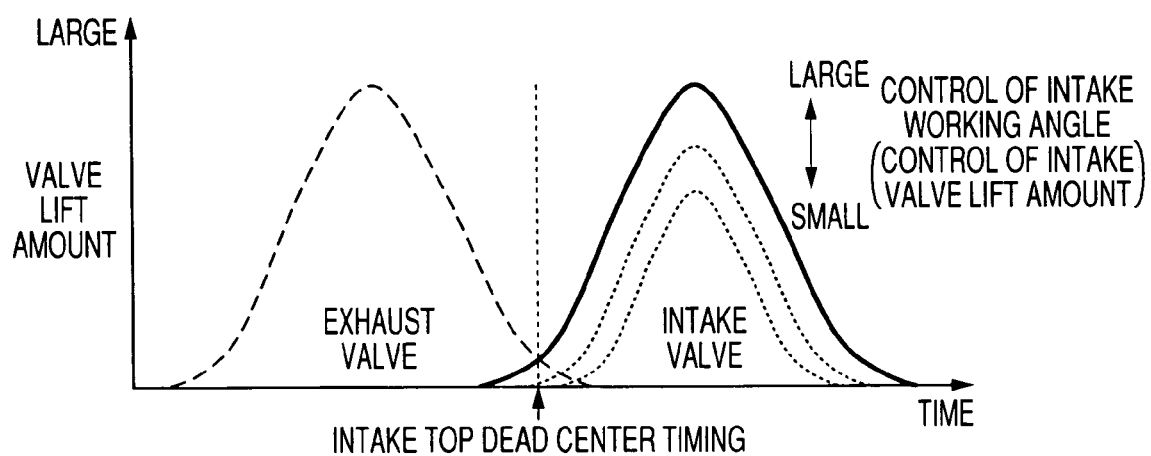

It is configured so that intake actuation timing of the intake valve 08 shifts from an intake top dead center position to the advance angle side or the retard angle side by controlling the intake variable valve timing mechanism 02 and exhaust actuation timing of the exhaust valve 09 shifts from the intake top dead center position to the advance angle side or the retard angle side by controlling the exhaust variable valve timing mechanism 03 as shown in FIG. 2A and also, an intake working angle of the intake valve 08, that is, an intake valve lift amount of the intake valve 08 is controlled by controlling the intake variable working angle mechanism 04 as shown in FIG. 2B.

The intake lift detection section 06 is section that detects an intake lift amount of the intake valve 08 and is configured by a magnetic detector that detects a rotational angle of the control shaft 83 rotated and driven by an electric motor, and both of the intake phase angle detection section 07A and the exhaust phase angle detection section 07B are configured by a signal processing circuit that detects respective phases based on a phase difference between a detection pulse signal by an electromagnetic pickup coil sensor that detects tooth parts of a pulse disk rotating with a cam shaft and a detection pulse signal by an electromagnetic pickup coil sensor that detects tooth parts of a pulse disk rotating with a crankshaft The variable valve control section 05 performs feedback control so that an intake lift amount detected by the intake lift detection section 06 or a phase angle detected by the intake phase angle detection section 07A and the exhaust phase angle detection section 07B becomes the control target value described above and as necessary, the amount of feedback is learned to correct the control target value. For example, at the time of a low load, retard angle control of the intake valve 08 or control of decreasing the lift amount of the intake valve 08 is performed and at the time of a high load, advance angle control of the intake valve 08 or control of increasing the lift amount of the intake valve 08 is performed.

The negative pressure suppression control section 01 performs control so as to suppress a situation in which the inside of the cylinder becomes a negative pressure when there is fear that both of the intake valve 08 and the exhaust valve 09 close the cylinder after at least the intake top dead center to cause the negative pressure at the time of valve control by the variable valve control section 05, based on an intake valve phase angle detected by the intake phase angle detection section 07A, an exhaust valve phase angle detected by the exhaust phase angle detection section 07B and an intake lift amount detected by the intake lift detection section 06.

Figure 3A:
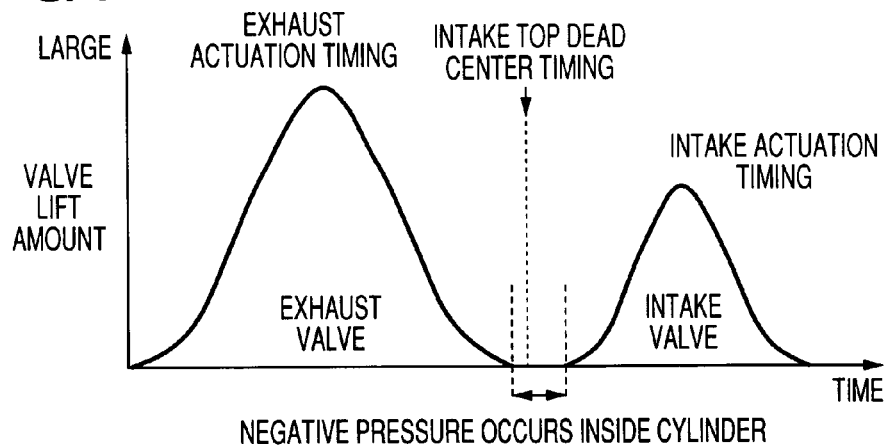
FIGS. 3A to 3C are explanatory diagrams of a relation between an intake valve lift amount and an exhaust valve lift amount in the case where a negative pressure occurs inside a cylinder.
Figure 3B:
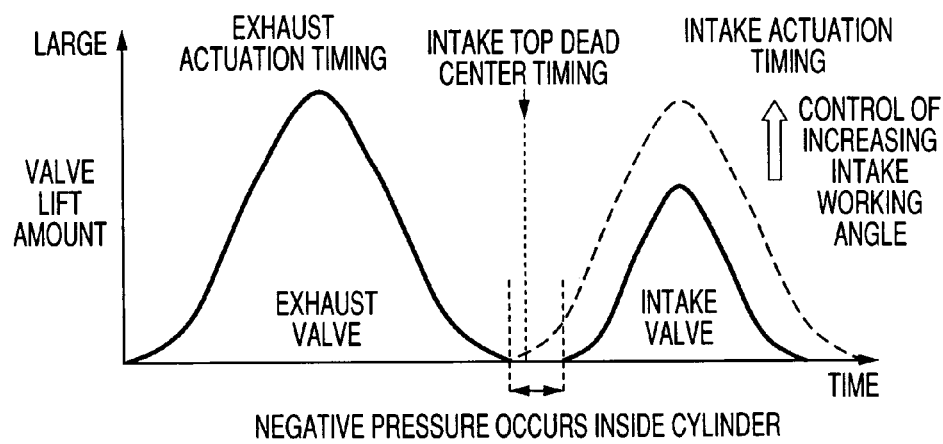
Figure 3C:
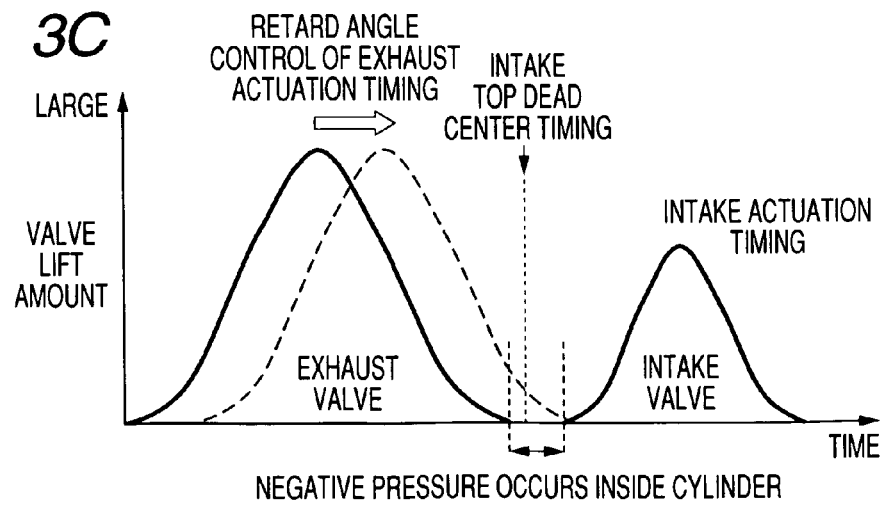

It is configured so that, for example, as shown in FIG. 3A, both of the intake valve 08 and the exhaust valve 09 close fully after the intake top dead center and as shown in FIG. 3B, correction control of the intake variable working angle mechanism 04 is performed through the variable valve control section 05 so as to perform control of increasing an intake working angle of the intake valve 08 in the case where it is determined that the inside of the cylinder becomes a negative pressure in the subsequent intake process or as shown in FIG. 3C, correction control of the exhaust variable valve timing mechanism 03 is performed through the variable valve control section 05 so as to perform retard angle control of exhaust actuation timing of the exhaust valve 09.

Figure 4A:
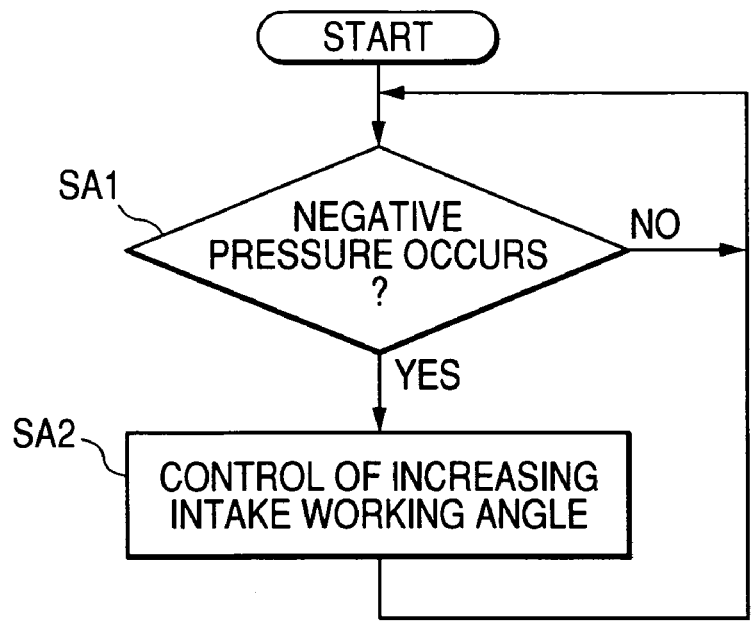
FIGS. 4A and 4B are flowcharts describing an operation of negative pressure suppression control section.

Referring to an operation of the negative pressure suppression control section 01 in this case based on a flowchart of FIG. 4A, the negative pressure suppression control section 01 performs correction control of the intake variable working angle mechanism 04 through the variable valve control section 05 so, as to perform control of increasing an intake working angle of the intake valve 08 (SA2) in the case where it is determined that the inside of a cylinder becomes a negative pressure by closing the cylinder after the intake top dead center from the vicinity of the intake top dead center (SA1), based on an intake valve lift amount detected by the intake lift detection section 06, an intake valve phase angle detected by the intake phase angle detection section 07A and an exhaust valve phase angle detected by the exhaust phase angle detection section 07B.

Figure 4B:
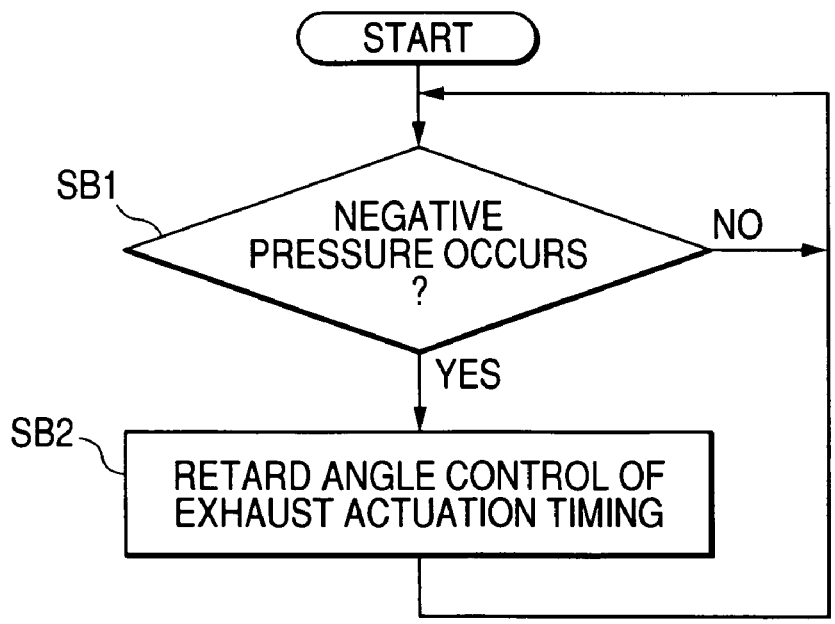

Here, the negative pressure suppression control section 01 may be configured to control the exhaust variable valve timing mechanism 03 through the variable valve control section 05 so as to perform retard angle control of exhaust actuation timing. That is, as shown in a flowchart of FIG. 4B, the negative pressure suppression control section 01 controls the exhaust variable valve timing mechanism 03 through the variable valve control section 05 so as to perform retard angle control of exhaust actuation timing of the exhaust valve 09 (SB2) in the case where it is determined that the inside of the cylinder becomes a negative pressure by closing the cylinder in the vicinity of the intake top dead center (SB1), based on an intake valve lift amount detected by the intake lift detection section 06, an intake valve phase angle detected by the intake phase angle detection section 07A and an exhaust valve phase angle detected by the exhaust phase angle detection section 07B.

Also, control may be performed so as to simultaneously perform correction control of the intake variable working angle mechanism 04 through the variable valve control section 05 so as to perform control of increasing an intake working angle and correction control of the exhaust variable valve timing mechanism 03 through the variable valve control section 05 so as to perform retard angle control of exhaust actuation timing. Then, a closing state of a cylinder can be avoided more surely and earlier, and a situation in which the inside of the cylinder becomes a negative pressure in an intake process is avoided. Thus, control is performed so as to shift to the primary control target value after a negative pressure state occurring transiently is avoided.

Figure 5:
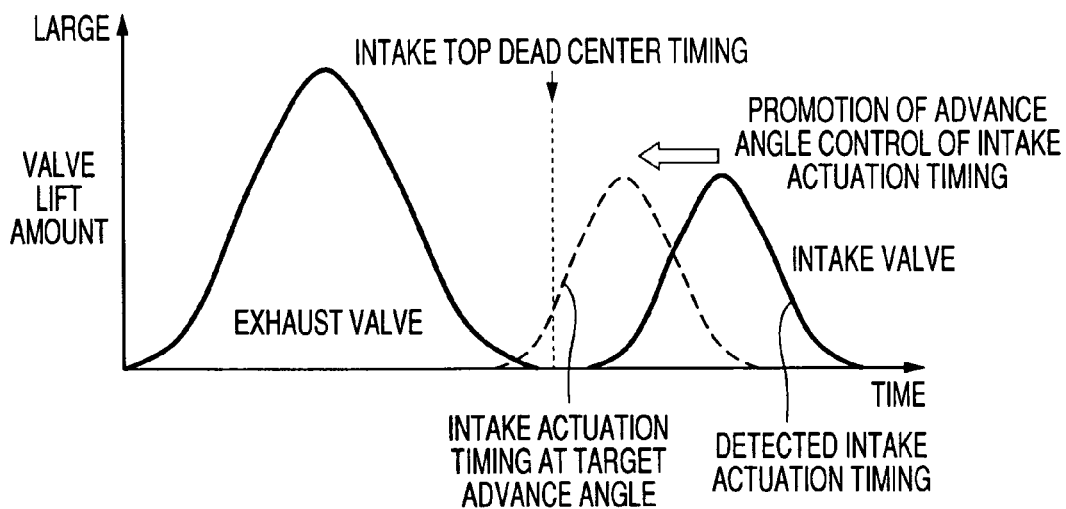
FIG. 5 is an explanatory diagram of promotion of advance angle control of intake actuation timing in negative pressure suppression control section.

Another embodiment will be described below. The negative pressure suppression control section 01 may be configured so as to perform pressure increase control of hydraulic oil in the advance angle chamber 95b in the intake variable valve timing mechanism 02, that is, promote advance angle control of intake actuation timing through the intake variable valve timing mechanism 02 by the variable valve control section 05 as shown in FIG. 5, for example, in the case where it is determined that an intake valve phase angle detected by the intake phase angle detection section 07A is smaller than a target advance angle of intake actuation timing by the variable valve control section 05 and the cylinder becomes a negative pressure in the vicinity of the intake top dead center due to control delay etc. by an oil hydraulic mechanism when advance angle control of intake actuation timing is performed through the intake variable valve timing mechanism 02 by the variable valve control section 05.

As the pressure increase control of hydraulic oil, in addition to an oil pump driven by an engine, a motor-driven pump is actuated or a reduction ratio to an oil pump is adjusted or the number of revolutions of an engine can be increased temporarily.

Figure 6:
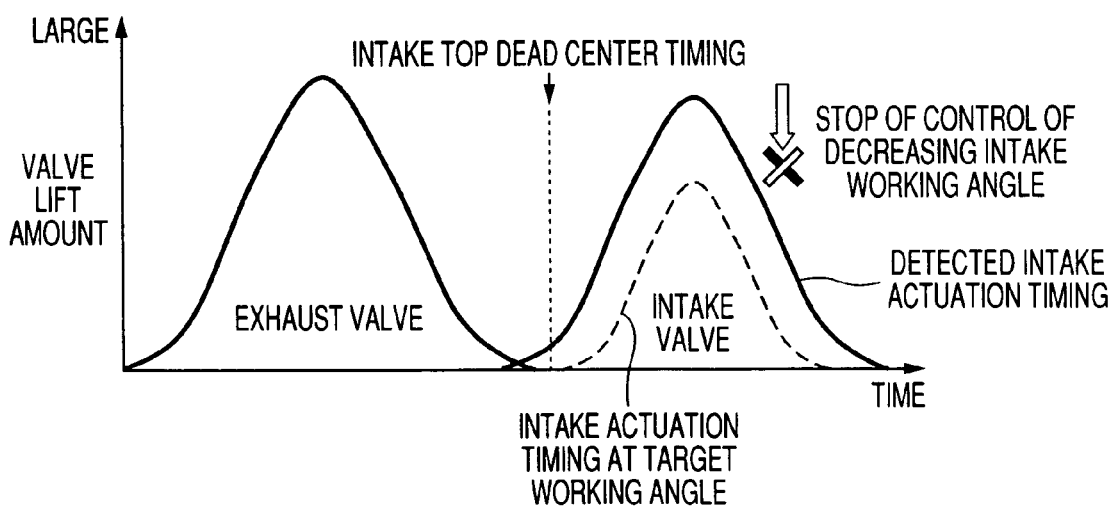
FIG. 6 is an explanatory diagram of a stop of control of decreasing an intake working angle in negative pressure suppression control section.

Also, the negative pressure suppression control section 01 may perform control so as to stop control of decreasing the intake working angle through the intake variable working angle mechanism 04 by the variable valve control section 05 as shown in FIG. 6, for example, in the case where it is determined that the inside of the cylinder becomes a negative pressure when an intake valve phase angle detected by the intake phase angle detection section 07A is smaller than a target advance angle of intake actuation timing by the variable valve control section 05 and an intake valve lift amount detected by the intake lift detection section 06 is larger than a target intake working angle at the time when advance angle control of intake actuation timing is performed through the intake variable valve timing mechanism 02 by the variable valve control section 05 and control of decreasing an intake working angle is performed through the intake variable working angle mechanism 04.

Figure 7:
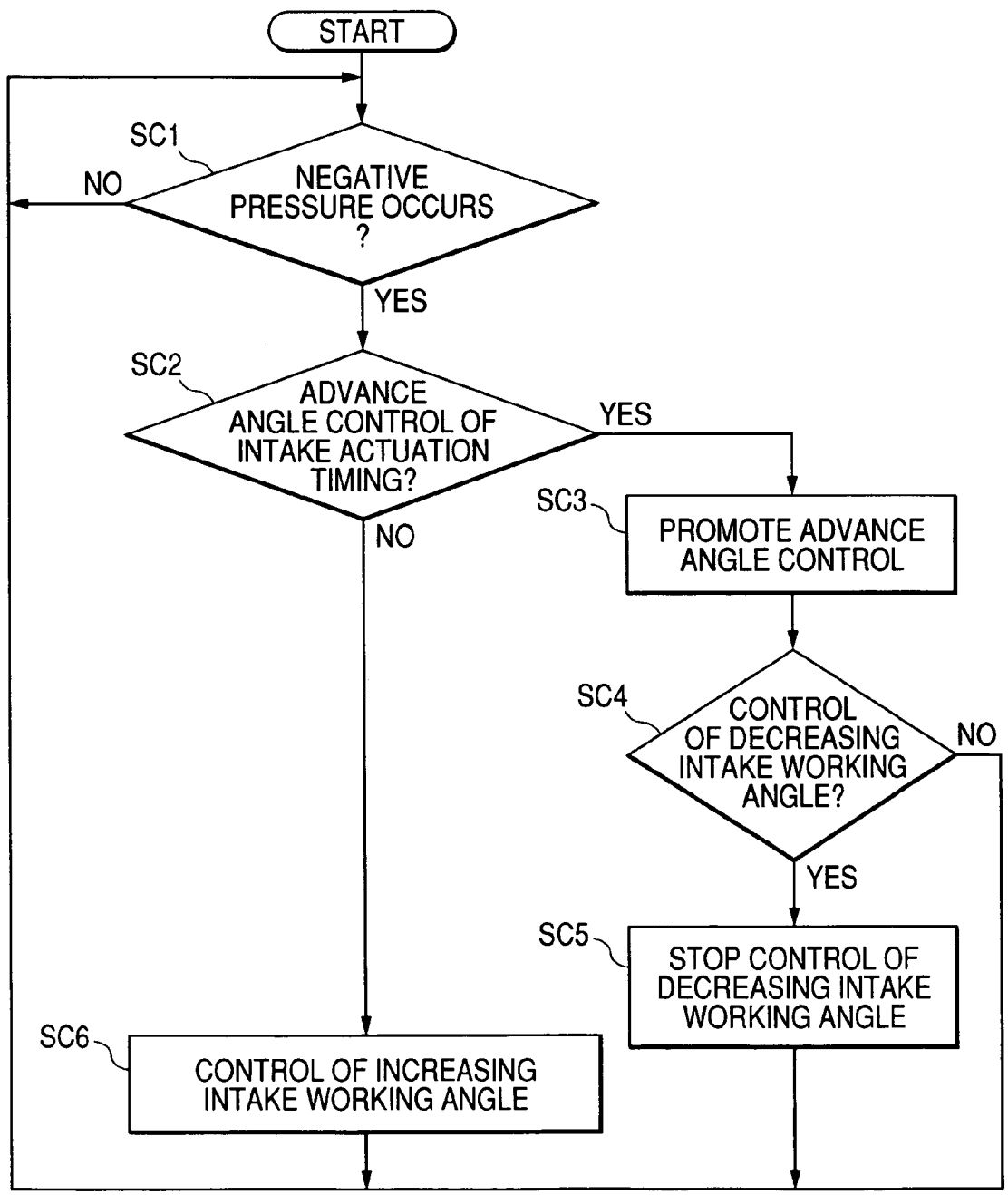
FIG. 7 is a flowchart describing an operation of negative pressure suppression control section in another embodiment.

That is, referring to an operation of the negative pressure suppression control section 01 based on a flowchart of FIG. 7, the negative pressure suppression control section 01 judges whether or not advance angle control of intake actuation timing is performed through the intake variable valve timing mechanism 02 by the variable valve control section 05 (SC2) in the case where it is determined that a cylinder becomes a negative pressure after the intake top dead center (SC1) based on an intake valve lift amount detected by the intake lift detection section 06 and a phase angle of an exhaust valve detected by the phase angle detection section 07B.

When the advance angle control of intake actuation timing is performed through the intake variable valve timing mechanism 02 by the variable valve control section 05, the negative pressure suppression control section 01 promotes the advance angle control of intake actuation timing through the intake variable valve timing mechanism 02 by the variable valve control section 05 (SC3) by increasing a pressure of an oil line that supplies hydraulic oil to the advance angle chamber 95b in the intake variable valve timing mechanism 02.

Also, when control of decreasing an intake working angle is performed through the intake variable working angle mechanism 04 by the variable valve control section 05 (SC4), the control of decreasing the intake working angle through the intake variable working angle mechanism 04 by the variable valve control section 05 is stopped (SC5).

When the advance angle control of intake actuation timing is not performed through the intake variable valve timing mechanism 02 by the variable valve control section 05 in the step SC2, the negative pressure suppression control section 01 controls the intake variable working angle mechanism 04 through the variable valve control section 05 so as to perform control of increasing an intake working angle (SC6).

In addition, the step SC6 may be configured to control the exhaust variable valve timing mechanism 03 through the variable valve control section 05 so as to perform retard angle control of an exhaust valve. Also, it may be configured to simultaneously perform control of the intake variable working angle mechanism 04 through the variable valve control section 05 so as to perform control of increasing the intake working angle and control of the exhaust variable valve timing mechanism 03 through the variable valve control section 05 so as to perform retard angle control of exhaust actuation timing. It is desirable to be able to avoid a closing state of a cylinder more surely and earlier, that is, avoid a situation in which the inside of the cylinder becomes a negative pressure.

Also, the step SC3 may be configured to promote the advance angle control of intake actuation timing through the intake variable valve timing mechanism 02 by the variable valve control section 05 by increasing and correcting a feedback control constant to the intake valve 08 actuated and controlled by the variable valve control section 05. At this time, it may be configured to perform increase and correction beyond an update limit range of feedback control constants of both or any of PI control normally performed by the variable valve control section 05.

Figure 8:
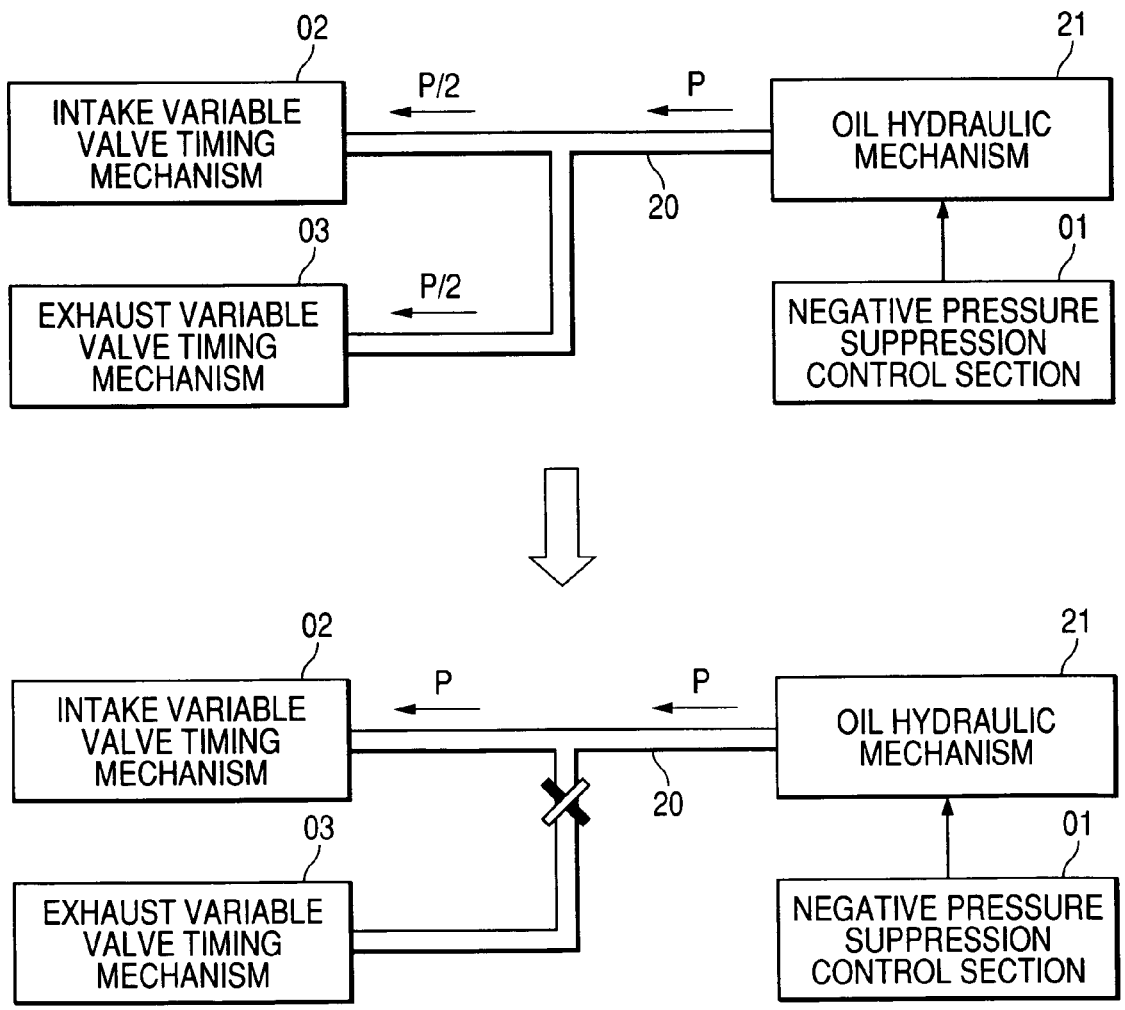
FIG. 8 is an explanatory diagram of pressure increase control of hydraulic oil in an intake variable valve timing mechanism 02 of the case of including an oil hydraulic mechanism.

Also, as shown in FIG. 8, the intake variable valve timing mechanism 02 and the exhaust variable valve timing mechanism 03 may include an oil hydraulic mechanism 21 that actuates the intake valve 08 and the exhaust valve 09 by hydraulic oil supplied through an oil line 20 common to respective advance angle chambers 95b. And the negative pressure suppression control section 01 may be configured to promote advance angle control of intake actuation timing through the intake variable valve timing mechanism 02 by the variable valve control section 05 by closing a valve of the oil line 20 to the advance angle chamber 95b in the exhaust variable valve timing mechanism 03, that is, the oil line 20 to the side of the exhaust valve 09. That is, for example, it may be configured so that when an output from the hydraulic mechanism 21 in an oil line 20a common to the intake variable valve timing mechanism 02 and the exhaust variable valve timing mechanism 03 has an oil pressure P, normally, an oil pressure in a branch oil line 20b to the advance angle chamber 95b of the intake variable valve timing mechanism 02 and an oil pressure in a branch oil line 20c to the advance angle chamber 95b in the exhaust variable valve timing mechanism 03 are respectively set at oil pressures into which the oil pressure P is divided, for example, P/2 and when an advance angle of actual intake actuation timing obtained based on an intake valve lift amount detected by the intake lift detection section 06 is smaller than a target advance angle of intake actuation timing by the variable valve control section 05, by closing the oil line 20c to the advance angle chamber 95b in the exhaust variable valve timing mechanism 03, an oil pressure in the branch oil line 20b to the advance angle chamber 95b in the intake variable valve timing mechanism 02 is increased and advance angle control of intake actuation timing of the intake valve 08 through the intake variable valve timing mechanism 02 by the variable valve control section 05 is promoted. In addition, it is not limited to the case of fully closing the oil line 20c to the advance angle chamber 95b in the exhaust variable valve timing mechanism 03, and the oil line 20c could be closed properly to the extent that an oil pressure in the branch oil line 20b to the advance angle chamber 95b in the intake variable valve timing mechanism 02 can be increased.

Instead of the negative pressure suppression control section 01 described above, it may be configured to include a negative pressure suppression control section 12 acting as a forcedly opening section that forcedly opens the intake valve 08 regardless of control of the intake valve 08 or the exhaust valve 09 through the intake variable valve timing mechanism 02, the exhaust variable valve timing mechanism 03, an intake variable working angle mechanism 04, etc. by the variable valve control section 05 in the case of deciding that a cylinder becomes a negative pressure in the vicinity of the intake top dead center as shown in FIG. 9.

As the forcedly opening section, a press driving mechanism for forcedly depressing the intake valve 08 through an actuator such as a solenoid can be disposed, and a situation in which the inside of a cylinder becomes a negative pressure can be avoided by forcedly opening the intake valve 08.

Figure 10B:
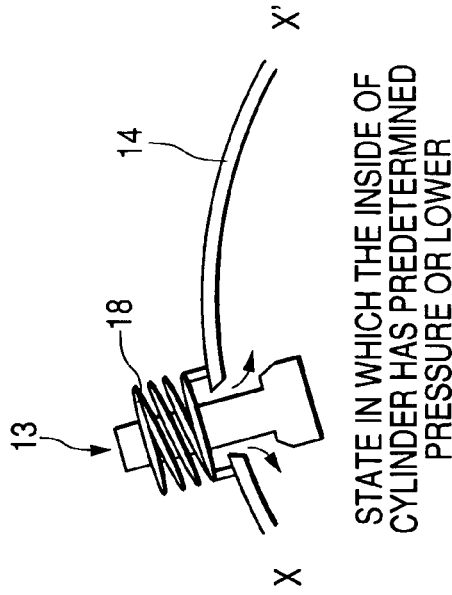
FIGS. 10A to 10C are explanatory diagrams of a pressure valve for forcedly supplying air to the inside of a cylinder.
Figure 10C:
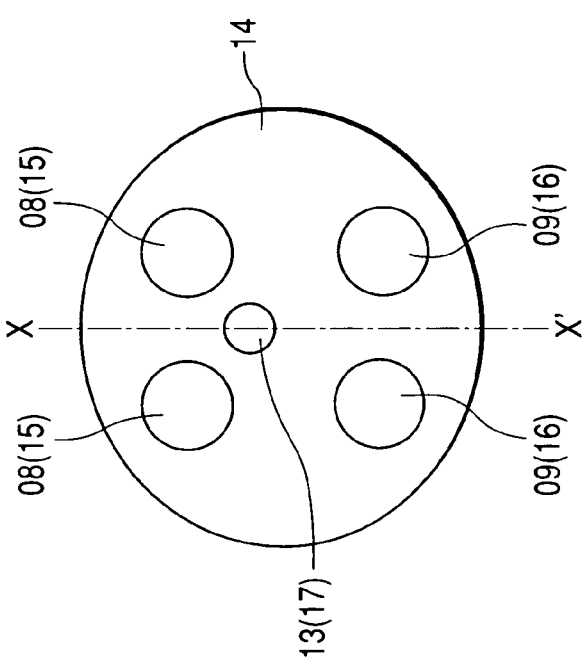
Figure 10A:
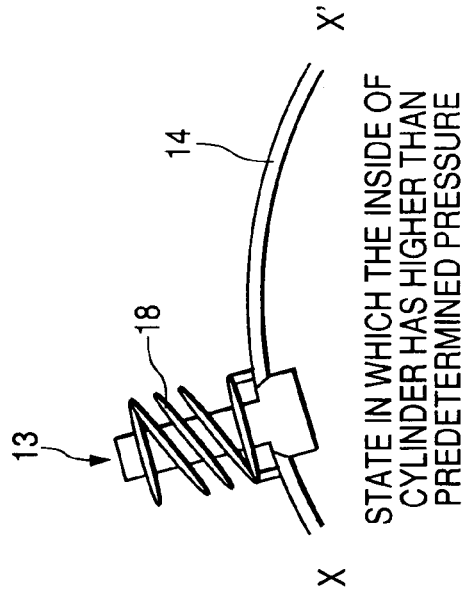

Also, the negative pressure suppression control section 01 may be configured so that a pressure valve that forcedly supplies air to the inside of a cylinder under a negative pressure is disposed in the top of the cylinder. For example, as shown in FIGS. 10A and 10B, a third port 17 is formed in a head region of the cylinder 14 nearer to an intake port 15 in which the intake valve 08 in the cylinder 14 is installed than an exhaust port 16 in which the exhaust valve 09 in the cylinder 14 is installed. And a pressure valve 13 including a spring mechanism 18 etc. is installed in the third port 17 and when a pressure of the inside of the cylinder 14 becomes a predetermined pressure or lower, as shown in FIG. 10C, the pressure valve 13 is constructed so as to be autonomously opened by the spring mechanism 18 etc. and air is forcedly supplied to the inside of the cylinder 14 and thereby, the inside of the cylinder 14 can be emerged from a negative pressure state.

It may be configured to include a throttle control section that performs control of decreasing an opening degree of an electronic control throttle when a negative pressure of the inside of a cylinder is suppressed by the negative pressure suppression control section described above. The throttle control section can prevent variations in engine torque by performing control of decreasing the opening degree of the electronic control throttle. That is, the throttle control section performs the control of decreasing the opening of the electronic control throttle and thereby, an increase in engine torque resulting from an increase in the amount of air of the inside of a cylinder because the negative pressure suppression control section suppresses a negative pressure of the inside of the cylinder is suppressed to prevent variations in the engine torque.

Also, it may be configured to include ignition timing control section that delays ignition timing when a negative pressure of the inside of the cylinder is suppressed by the negative pressure suppression control section. The ignition timing control section can prevent variations in engine torque by delaying ignition timing. That is, the ignition timing control section delays ignition timing and thereby, an increase in engine torque resulting from an increase in the amount of air of the inside of a cylinder because the negative pressure suppression control section suppresses a negative pressure of the inside of the cylinder is suppressed to prevent variations in the engine torque.

Further, it may be configured to include fuel injection quantity control section for decreasing or stopping a fuel injection quantity when a negative pressure of the inside of a cylinder is suppressed by the negative pressure suppression control section. The fuel injection quantity control section can prevent variations in engine torque by decreasing or stopping a fuel injection quantity. That is, the fuel injection quantity control section decreases or stops a fuel injection quantity and thereby, an increase in engine torque resulting from an increase in the amount of air of the inside of a cylinder because the negative pressure suppression control section suppresses a negative pressure of the inside of the cylinder is suppressed to prevent variations in the engine torque.

In addition, the embodiments described above are only one example of the invention, and it goes without saying that concrete configurations etc. of each block can be changed and designed properly within the scope having the action and effect of the invention.

The entire disclosure of Japanese Patent Application No. 2005-139440 filed on May 12, 2005 including specification, claims, drawings and abstract is incorporated herein be reference in its entirety.

What is claimed is:

1. A variable valve control apparatus comprising:
   a variable valve timing mechanism that adjusts an actuation timing of an intake valve and an actuation timing of an exhaust valve;
   a variable working angle mechanism that adjusts a working angle of the intake valve;
   a variable valve control section that controls at least one of the variable valve timing mechanism and the variable working angle mechanism based on an engine load; and
   a negative pressure suppression control section,
   wherein the negative pressure suppression control section suppresses a negative pressure of an inside of a cylinder when the negative pressure suppression control section determines that both of the intake valve and the exhaust valve close at least after an intake top dead center, based on an opening condition of the intake valve and an opening condition of the exhaust valve.

2. The variable valve control apparatus according to claim 1,
wherein the negative pressure suppression control section performs control of increasing the working angle of the intake valve when the negative pressure suppression control section determines that both of the intake valve and the exhaust valve close.

3. A variable valve control apparatus according to claim 2, further comprising:
a throttle control section that performs control of decreasing an opening degree of an electronic control throttle when the negative pressure of the inside of the cylinder is suppressed by the negative pressure suppression control section.

4. A variable valve control apparatus according to claim 2, further comprising:
an ignition timing control section that delays an ignition timing when the negative pressure of the inside of the cylinder is suppressed by the negative pressure suppression control section.

5. A variable valve control apparatus according to claim 2, further comprising:
a fuel injection quantity control section that decreases a fuel injection quantity when the negative pressure of the inside of the cylinder is suppressed by the negative pressure suppression control section.

6. The variable valve control apparatus according to claim 1,
wherein the negative pressure suppression control section performs a retard angle control of the exhaust valve when the negative pressure suppression control section determines that both of the intake valve and the exhaust valve close.

7. The variable valve control apparatus according to claim 1,
wherein the negative pressure suppression control section increases a feedback control constant to the intake valve in the variable valve control section when (i) the variable valve control section performs an advance angle control of the intakes valve and (ii) the negative pressure suppression control section determines that both of the intake valve and the exhaust valve close.

8. The variable valve control apparatus according to claim 1,
wherein the negative pressure suppression control section stops controlling of decreasing the working angle of the intake valve by the variable valve control section when (i) the variable valve control section performs an advance angle control of the intakes valve and control of decreasing the working angle of the intakes valve, and (ii) the negative pressure suppression control section determines that both of the intake valve and exhaust valve close.

9. The variable valve control apparatus according to claim 1,
wherein the negative pressure suppression control section performs control of increasing a pressure of hydraulic oil for actuating the variable valve timing mechanism when (i) the variable valve control section performs an advance angle control of the intake valve and (ii) the negative pressure suppression control section determines that both of the intake valve and the exhaust valve close.

10. A variable valve control apparatus according to claim 9,
wherein the variable valve timing mechanism comprises an oil hydraulic mechanism that supplies the hydraulic oil through a common oil line to actuates the intake valve and the exhaust valve; and
wherein the negative pressure suppression control section closes an oil line connected to the exhaust valve when (i) the variable valve control section performs the advance angle control of the intake valve and (ii) the negative pressure suppression control section determines that both of the intake valve and the exhaust valve close.

11. A variable valve control apparatus according to claim 1,
wherein the negative pressure suppression control section comprises a forced opening section that forcedly opens the intake valve regardless of valve control by the variable valve control section when the negative pressure suppression control section determines that both of the intake valve and the exhaust valve close.

12. A variable valve control apparatus according to claim 1,
wherein the negative pressure suppression control section comprises a pressure valve that forcedly supplies air to the inside of the cylinder when the negative pressure suppression control section determines that both of the intake valve and the exhaust valve close.

13. A variable valve control apparatus comprising:
a valve timing control section that controls an actuation timing of an intake valve and an actuation timing of an exhaust valve by controlling a variable valve timing mechanism;
a working angle control section that controls a working angle of the intake valve by controlling a variable working angle mechanism; and
a negative pressure suppression control section that performs control of suppressing a negative pressure of an inside of a cylinder when the negative pressure suppression control section determines that both of the intake and the exhaust valve close at least after an intake top dead center based on operation states of the intake valve and the exhaust valve.

14. A variable valve control apparatus comprising:
a valve timing control section that controls an actuation timing of an intake valve and an actuation timing of an exhaust valve by controlling a variable valve timing mechanism operated by an oil pressure; and
a working angle control section that controls a working angle of the intake valve by controlling a variable working angle mechanism operated by a motor,
wherein the working angle control section performs control of increasing a working angle of at least one of the intake valve and the exhaust valve when the working angle control section determines that both of the intake and the exhaust valve close at least after an intake top dead center based on operation states of the intake valve and the exhaust valve.

* * * * *